United States Patent [19]

Sanpei et al.

[11] Patent Number: 4,669,549
[45] Date of Patent: Jun. 2, 1987

[54] RAKE DEVICE FOR ROTARY CULTIVATORS

[75] Inventors: Keiichi Sanpei; Yoshitaka Satoh; Yoshimitsu Ohashi, all of Osaka, Japan

[73] Assignee: Kubota Ltd., Osaka, Japan

[21] Appl. No.: 782,542

[22] Filed: Oct. 1, 1985

[30] Foreign Application Priority Data

Sep. 28, 1984 [JP] Japan .......................... 59-147537[U]
Apr. 17, 1985 [JP] Japan ............................ 60-57893[U]

[51] Int. Cl.⁴ .......................................... A01B 33/02
[52] U.S. Cl. ..................................... 172/112; 172/72
[58] Field of Search ................ 172/112, 113, 32, 643, 172/763, 707, 71, 72, 91, 94, 63

[56] References Cited

U.S. PATENT DOCUMENTS

| | | | |
|---|---|---|---|
| 1,145,963 | 7/1915 | Bame | 172/707 |
| 3,557,880 | 1/1971 | van der lely | 172/91 |
| 3,995,570 | 12/1976 | van der lely | 172/112 |
| 4,556,113 | 12/1985 | Saito | 172/91 |

FOREIGN PATENT DOCUMENTS

372765  5/1932  United Kingdom ................. 172/72

Primary Examiner—Richard J. Johnson
Attorney, Agent, or Firm—Birch, Stewart, Kolasch & Birch

[57] ABSTRACT

A tiller cover assembly covering a rotary tiller unit is provided inside thereof with rake members arranged at a spacing along the width of cultivation for sieving lumps or blocks of soil carried around by the tiller unit. Each of the raker members is made of a resilient rod which has a coiled portion toward its base end and is fixed to an attaching member at the base end above the coiled portion. The coiled portions of the rake members are projected toward an upwardly or downwardly movable rear cover of the cover assembly, permitting the rear cover to contact the coiled portions. A clearance is formed between sieving portions of the rake members extending downward from the coiled portions to their free ends and the rear cover. A protector is provided on the inner side of the coiled portions, by which the lumps or blocks of soil carried around by the tiller unit are prevented from striking the coiled portions.

8 Claims, 19 Drawing Figures

RAKE DEVICE FOR ROTARY CULTIVATORS

FIELD OF THE INVENTION AND RELATED ART STATEMENT

The present invention relates to a resiliently deformable rake device for rotary cultivators which is adapted to sieve cultivated soil into a surface layer of small soil particles and an underlying layer of large soil lumps or blocks of soil.

"Cultivation for Soil Preparation," special edition of Kikaika Nogyo (Mechanized Agriculture), October 1984, and U.S. Pat. No. 3,557,880, for example, disclose rotary cultivators equipped with a rake which is disposed inside a cover for the rotary tiller unit and which comprises resilient rake members, such as rods or striplike bars, arranged in a row along the width of cultivation.

With cultivators of this type, the cultivated soil is sieved by the rake into a surface layer of fine particles of soil and an underlying layer of lumps of soil. Accordingly, the rake is struck by the cultivated soil.

The rake of the prior art disclosed in the above publications has a drawback. When stones, hard soil etc. strike rake members upon scattering during cultivation, the impact will be mitigated if not exceeding the elastic limit of the rake member, but higher impact is likely to bend the rake member or cause damage to welded portions.

Furthermore, the rear cover, which is shiftable upward or downward according to the depth of cultivation, assumes a nearly vertical posture to contact the acting portion of the rake when the depth of cultivation is small. Although separated fine soil particles need to be thrown rearward by the rake over a larger distance than soil blocks, the rear cover, when in contact with the rake, hampers the raking action and permits the soil to adhere to the cover.

OBJECTS AND SUMMARY OF THE INVENTION

A first object of the present invention is to provide rake members each in the form of a resilient rod and having coiled portions so that the coiled portions will mitigate and absorb impact to prevent damage to the rake attaching portion to the greatest possible extent.

A second object of the present invention is to provide rake members having coiled portions which are projected toward the rear cover to permit the rear cover to contact the coiled portions, to thereby form a clearance between the rear cover and the sieving portion of the rake and consequently to assure the desired raking or sieving action irrespective of the depth of cultivation.

A third object of the present invention is to attach protector means to the tiller cover for preventing soil, stones, etc. from striking the coiled portions of rake members so as to permit the coiled portions to fully undergo elastic deformation and to enable the rake to operate satisfactorily over a prolonged period of time.

The first object of the invention can be fulfilled by a rake device for rotary cultivators which comprises rake members each made of a resilient rod and having a coiled portion toward its base end, each of the rake members being fixedly connected to the tiller cover, assembly of the cultivator at a position toward its base end from the coiled portion, permitting elastic deformation of the coiled portion.

The second object of the invention can be fulfilled by a rake device of the type described wherein the coiled portions of the rake members positioned toward the base end thereof are projected toward the rear cover of the tiller cover assembly to permit the rear cover to contact the coiled portions and to form a clearance between the rear cover and the sieving portions of the rake members toward their free ends from the coiled portions.

The third object of the invention can be fulfilled by a rake device of the type described wherein the coiled portions of the rake members are provided on the inner side thereof with a protector extending from the tiller cover assembly for blocking the cultivated soil, stones, etc. carried around by the tiller unit when it is rotating in an upward cutting direction to prevent deformation of the coiled portions and adhesion of soil and other extraneous matter to these portions and to assure the coiled portions of elastic restoration.

BRIEF DESCRIPTION OF THE DRAWINGS

FIGS. 1 to 4 show a first embodiment of the invention,

FIGS. 13 to 17 show an eighth embodiment of the invention,

DESCRIPTION OF THE PREFERRED EMBODIMENTS

Embodiments of the present invention will be described below with reference to the accompanying drawings. Throughout the drawings, like parts are referred to by like reference numerals.

With reference to a first embodiment shown in FIGS. 1 to 4, a rotary cultivator 1 equipped with a rake 16 is upwardly or downwardly movably connected to an unillustrated tractor by a link assembly 2.

A tine shaft 4A, rotatable about a horizontal axis, is supported by a frame 3 and has a multiplicity of tines 4 which are adapted for both upward cutting and downward cutting to provide a tiller unit 5.

The tiller unit 5 receives torque from the PTO shaft of the tractor via a universal joint shaft or the like and is rotated in the direction of upward cutting indicated by an arrow A or in the direction of downward cutting opposite thereto.

The tiller unit 5 is covered with a tiller cover assembly 6, which comprises a main cover 7 attached to the frame 3, a rear cover 9 upwardly or downwardly movably pivoted to the rear end of the main cover 7 by a hinge 8, front and rear side covers 10, 11 at opposite sides of the unit 5, etc. A leveling portion 9A formed at the rear edge of the rear cover 9 is biased toward the ground by spring means 12. The downward biasing force of the spring means 12 is adjustable.

A pair of opposite gauge wheels 13 for setting the depth of work to be performed by the tiller unit 5 is connected to the frame 3 by a support bar 14. The work depth is adjustable by adjusting means 15 connecting the support bar 14 to the frame 3.

With the present embodiment, the gauge wheels 13 are positioned in the rear of the tiller unit 5.

The rake 16 is provided inside the tiller cover 6 and comprises many rake members in the form of tough metal bars or like resilient rods 17 arranged in a row at a spacing in the direction of width of cultivation. Each bar 17 is entirely treated for rust inhibition; for example, it is formed with a phosphate coating.

The resilient rod 17 is bent to a U-shape at the midportion of its length, and upwardly coiled portions are formed symmetrically at the opposite sides of the u-shaped portion 19 in the vicinity thereof. Opposed circular arc rod portions extend from the coiled portions 19 to serve as sieving portions 20 which are in parallel with each other and spaced apart by a distance L. The portions 20 have free ends.

Thus, the rake 16 comprises rake members each of which is made of the resilient rod 17. The coiled portions 19 close to the base end of the rake member extend away from each other downward when seen in a rear view, and the sieving portions 20 extend downward from the coiled portions 19. The coiled portions 19 are projected toward the rear cover 9 beyond the sieving portions 20, permitting the rear cover 9 to contact the coiled portions 19 only. Even when the rear cover 9 assumes a nearly vertical posture, the contact of the coiled portions 19 with the rear cover 9 provides at least a clearance C between the cover 9 and the sieving portions 20, thus spacing the cover away from these portions.

The base end of the rake 16 is fixedly connected to the tiller cover assembly 6 while permitting elastic deformation of the coiled portions 19.

According to the present invention, a T-shaped holder 21 is fitted from outside to the U-shaped portion 18 of the rake member, i.e. the resilient rod 17, and curved portions 22 at the opposite sides of the holder 21 are pressed against the rod by a bolt 23 through the center of the holder 21 (FIG. 3), with a nut 24 screwed on the bolt. These elements provide fixing means 25.

The coiled portions 19 are provided on the inner side thereof with protector means 26 for preventing scattering soil, stones, grass, etc. from adhering to the coiled portions 19 from inside to assure proper elastic deformation of the coiled portions 9.

Figures 2, 3:
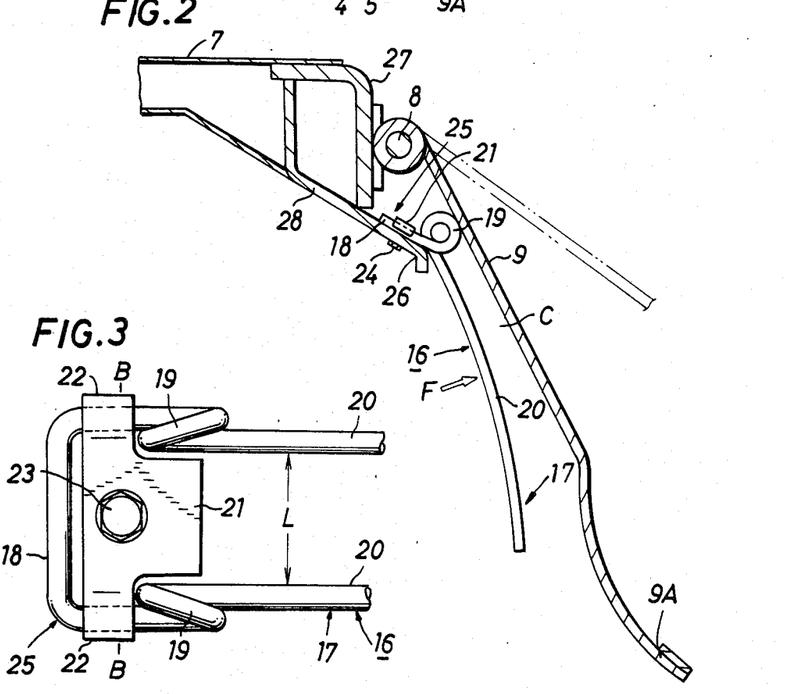
FIG. 2 being a side elevation in section.
FIG. 3 being a fragmentary plan view.

More specifically with reference to FIG. 2 showing the first embodiment, a skeleton member 27 for the main cover 7 is internally provided with a rake attaching member 28 which extends obliquely rearward to provide the protector means 26. The nut 24 is welded to the member 28. The weld also constitutes the fixing means 25.

Figure 4:
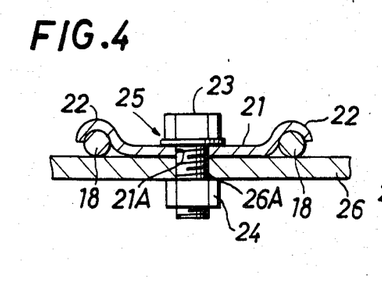
FIG. 4 being a view in section taken along the line B—B in FIG. 3.

FIG. 4 shows a bolt hole 21A formed in the holder 21 and a bolt hole 26A formed in the protector means 26. The resilient rod 17 is removably fixed to the protector means 26 by the bolt 23 inserted through the holes 21A, 26A and the nut 24.

Figures 5, 7:
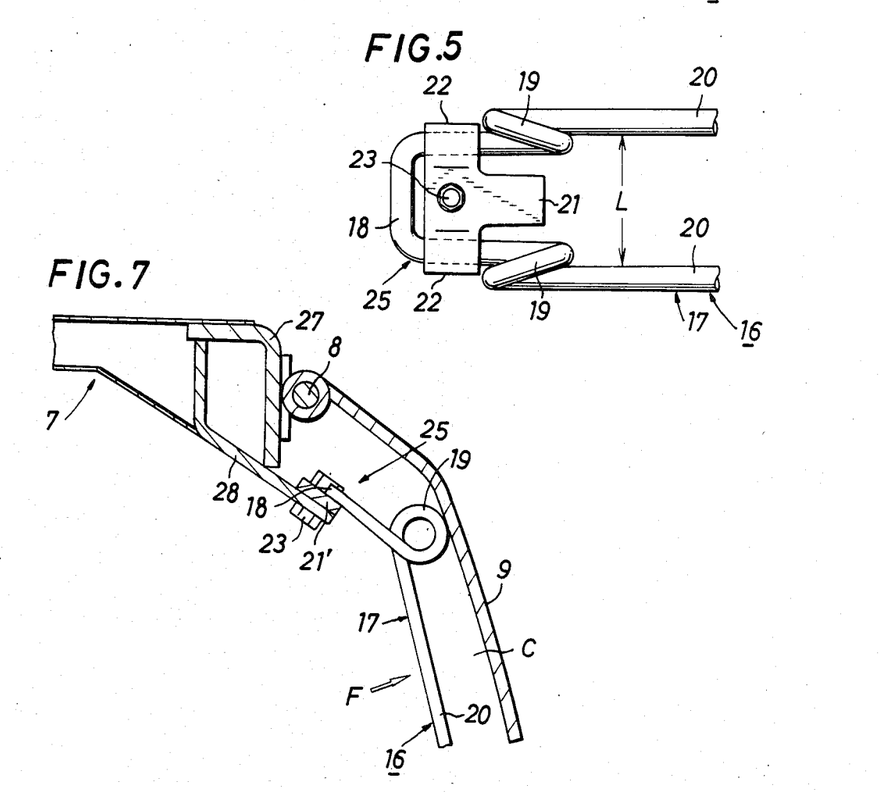
FIG. 5 is a fragmentary plan view showing a second embodiment.
FIGS. 7 and 8 are a side elevation in section and a fragmentary plan view showing a fourth embodiment.

FIG. 5 shows a second embodiment of the present invention which basically has the same construction as the first except the following feature.

With reference to FIG. 5, a rake member prepared from a single resilient rod 17 has coiled portions 19 which extend toward each other downward when seen in a rear view unlike those of the first embodiment. Accordingly, when the first and second embodiments are the same in prong-to-prong spacing L of the rake, the U-shaped portion 18 of the second embodiment has a shorter span, and the holder 21 used is smaller in size and lower in holding pressure.

Figure 6:
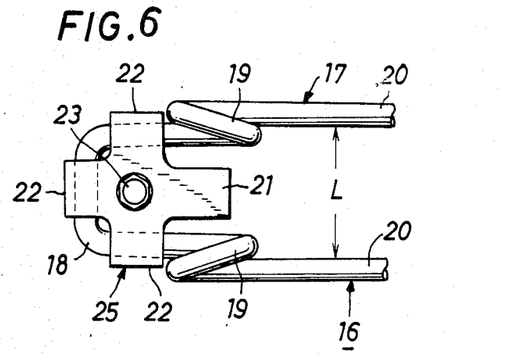
FIG. 6 is a fragmentary plan view showing a third embodiment.

Accordingly, the holder 21 of a third embodiment shown in FIG. 6 has a curved portion 22 also at the top side of the U-shaped portion 18 so as to press down the U-shaped portion 18 advantageously.

Figure 8:
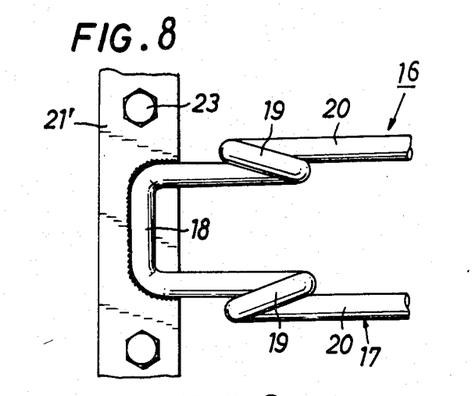

FIGS. 7 and 8 show a fourth embodiment, in which a strip 21' is used in place of the holder 21. The U-shaped portion 18 of the rake member or rod 17 is welded to the strip 21', which in turn is fixed to the attaching member 28 by bolts 23.

According to the fourth embodiment, the rake 16 is easy to install in place or remove since all the rake members can be welded to the single strip 21'.

Figures 9, 10:
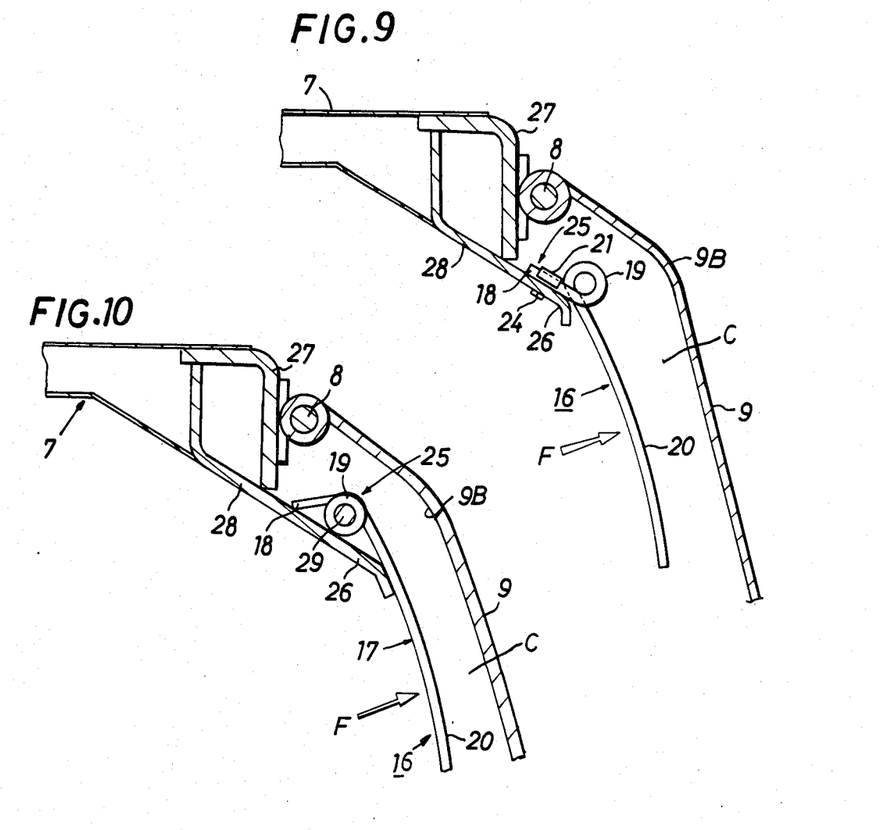
FIG. 9 is a side elevation in section showing a fifth embodiment.
FIG. 10 is a side elevation in section showing a sixth embodiment.

FIGS. 9 and 10 show a fifth embodiment and a sixth embodiment, respectively. With these embodiments, the rear cover 9 is formed with a curved portion 9B positioned toward its upper end and opposed to the coiled portions 19. When the depth of cultivation is large, the leveling portion 9A contacts the ground. A large space C is then formed behind the coiled portions 19.

Figures 11, 12, 13:
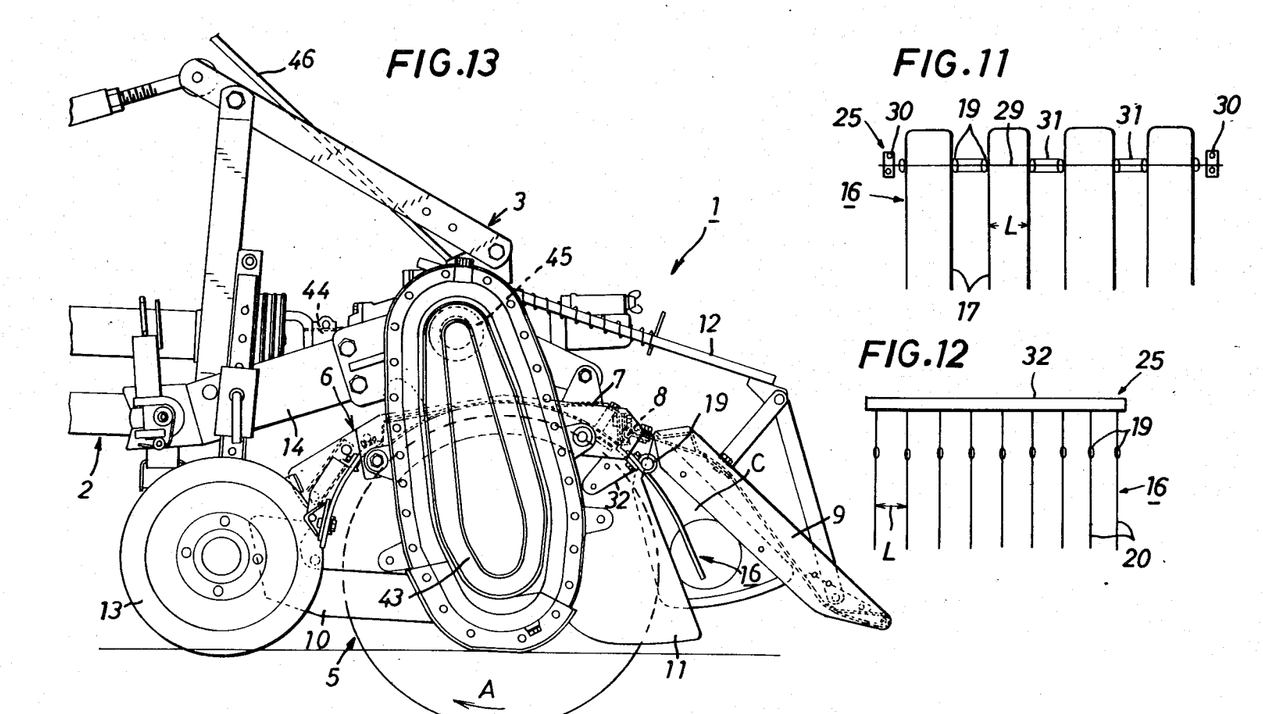
FIG. 11 is a rear view schematically showing the sixth embodiment.
FIG. 12 is a rear view schematically showing a seventh embodiment.
FIG. 13 being an overall side elevation.

The sixth embodiment is shown also in FIG. 11. Although the coiled portions 19 in the first to fifth embodiments are projected upward, the coiled portions 19 of the sixth embodimentare projected downward, and an attaching rod 29 is inserted throught the coiled portions 19 loosely. The opposite ends of the attaching rod 29 are fixed by fasteners 30 or the like.

Although the coiled portions 19 have the rod 29 extending therethrough, with the rake members held at a spacing L by spacers 31, the coiled portion 19 is elastically deformable in the loosening direction when the sieving portion 20 extending therefrom is subjected to impact F. More specifically, the U-shaped portion 18 bears on the upper surface of the protector means 26 while the coiled portion 19 is being allowed to elastically deform.

The rake 16 of the sixth embodiment bears on the lower end of the protector means 26.

FIG. 12 shows a seventh embodiment, in which each resilient rod 17 has a coiled portion. Such rods 17 are arranged in a row and fixed to a base plate 32, which is removably installed in place as by unillustrated bolts.

While the rake members of the first to third embodiments are individually removably fixed to the attaching member 28, the rake 16 of each of the sixth and seventh embodiments, like the fourth embodiment, can be removably fixed in place as an assembly.

FIGS. 13 to 17 show an eighth embodiment of the invention which is the most preferred example. According to this embodiment, a pair of support rods 14 extends downwardly forward from the frame 3 and carries gauge wheels 13 as seen in FIG. 13. Thus, the rotary cultivator 1 shown and equipped with a rake 16 has the gauge wheels in front of its tiller unit 5.

Figure 14:
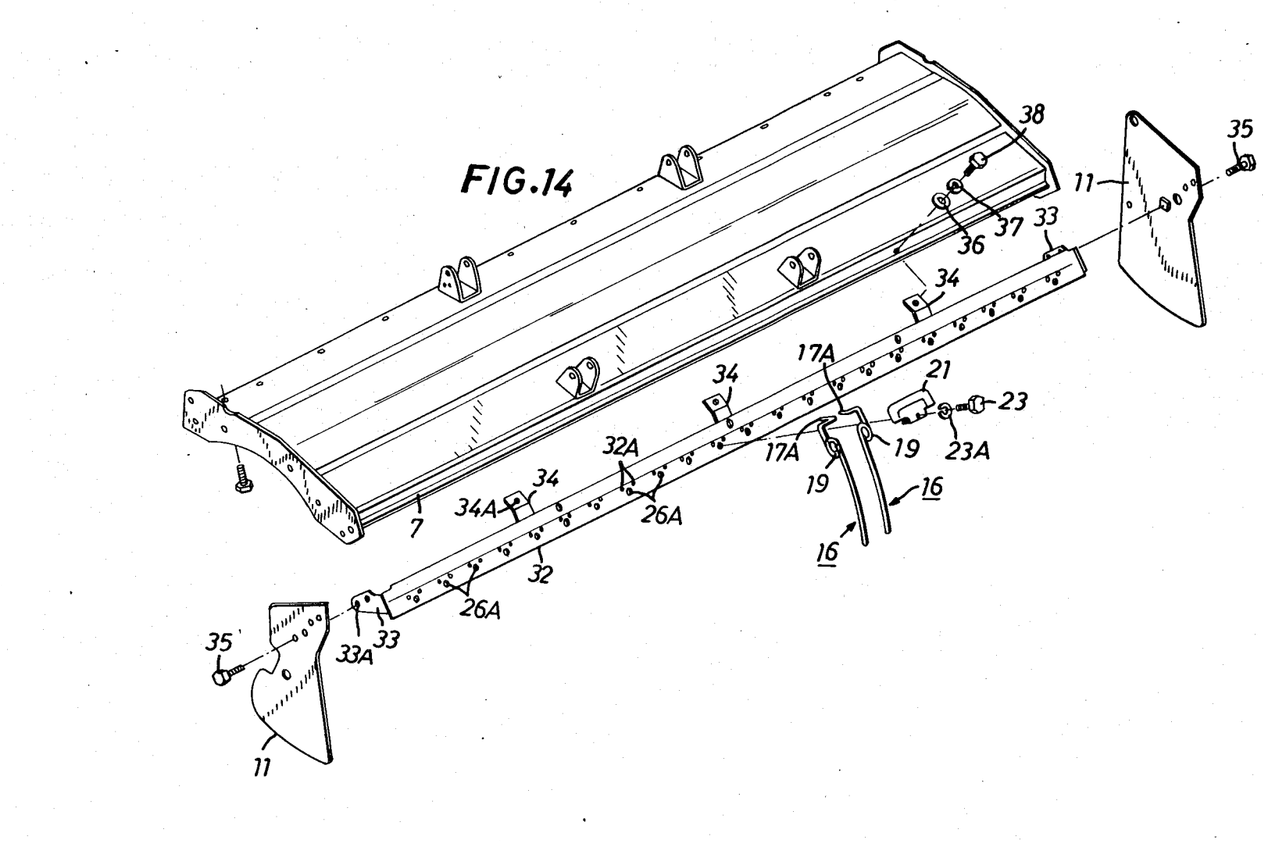
FIG. 14 being a fragmentary exploded perspective view.
Figure 15:
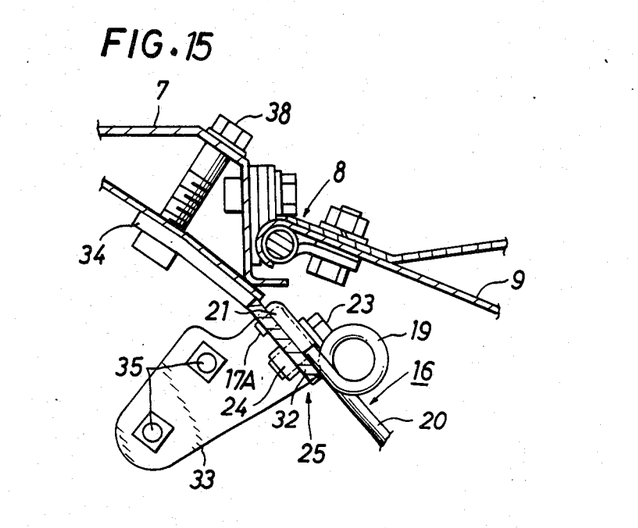
FIG. 15 being a fragmentary side elevation in section.

As seen in FIG. 14, an attaching base plate 32 is fixedly provided at each end with an end plate 33 having bolt holes 33A. According to the present embodiment, the base plate 32 is fixedly provided with three mount pieces 34 spaced apart longitudinally thereof and each having a bolt hole 34A.

The end plate 33 is removably fixed to the corresponding side cover 11 by bolts 35. Each mount piece 34 is attached to the main cover 7 by a bolt 38, with a plain washer 36 and a spring washer 37 interposed therebetween.

The attaching base plate 32 is formed with 24 bolts holes 26A arranged at a spacing longitudinally thereof for holders 21. At opposite sides of each bolt hole 26A to the front thereof, the base plate 32 is formed with holes 32A. A rake member in the form of a resilient rod 17 has an upper hooked end 17A which is inserted in the hole 32A.

Figure 16:
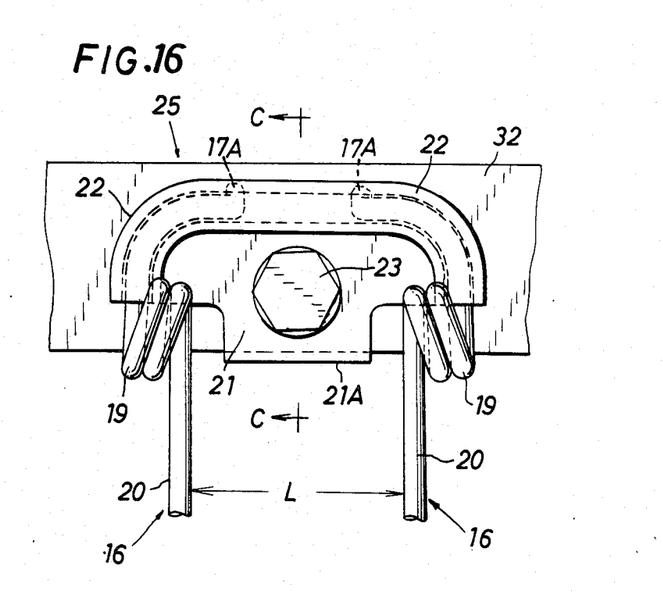
FIG. 16 being a fragmentary plan view.
Figure 17:
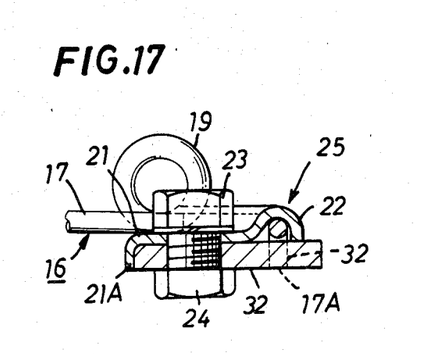
FIG. 17 being a view in section taken along the line C—C in FIG. 16.

According to the eighth embodiment, the resilient rod 17 has a double-turn coiled portion 19 as seen in FIG. 16. The holder 21 has a lug 21B in engagement with the rear edge of the base plate 32 to hold the holder against rotation and is attached to the base plate 32 by a bolt 23, with a spring washer 23A provided between the holder and the bolt head. The holder 21 has curved portions 22 which press the base end portions of two rake members, i.e., resilient rods 17, against the base plate 32, with the hooked portions 17A of the two rods inserted in holes 32A.

With the eighth embodiment, the resilient rods 17 can be replaced not only individually but also all at the same time.

Figure 18:
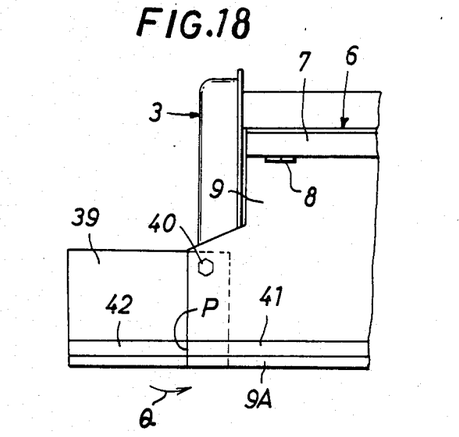
FIG. 18 is a rear view showing an extension cover.
Figure 19:
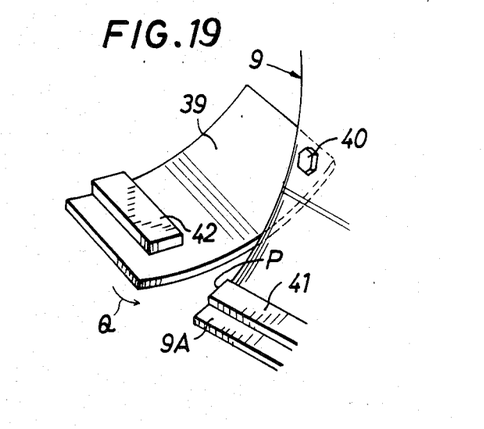
FIG. 19 is a perspective view illustrating the same.

FIGS. 18 and 19 show an example of extension cover 39, which is removably attached to each side of the leveling portion 9A at the rear lower end of the rear cover 9. Although the extension cover 39 was conventionally attached to the rear cover 9 by at least two bolts, it is fixed by only one bolt 40 according to the invention.

A reinforcement plate 41 in the form of a strip is attached to the rear cover 9 on the upper surface of its lower end. The extension cover 39 also has a reinforcement plate 42 fixed to its upper surface in corresponding relation to the plate 41.

The plate 42 is locally absent at one side portion of the extension cover 39 overlapping the rear cover 9. At this portion, the end of the plate 42 is in contact with the edge of the rear cover 9 and the end face P of the reinforcement plate 41, whereby the extension cover 39 fastened to the rear cover by the single bolt 40 is prevented from rotating in the direction of arrow Q.

The extension cover 39 overlaps the lower surface of the lower portion of the rear cover 9 and therefore does not move upward, while the cover 39 does not move downward either because of the resistance of soil. Thus, the cover 39 can be easily removably attached to the rear cover 9 by only one bolt 40.

Figure 1:
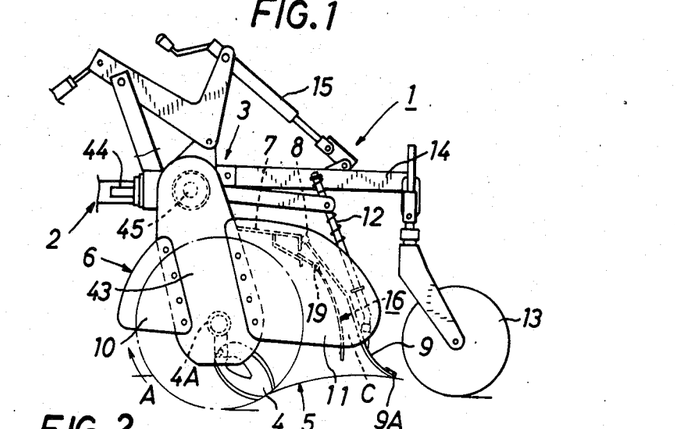
FIG. 1 being an overall side elevation.

FIGS. 1 and 13 show a side transmission case 43 housing wrapping connector drive means for driving a sprocket shaft 4A.

Indicated at 44 is a power input shaft which is coupled to gear transmission means within a transmission case provided at the center of the frame 3. The gear transmission means has an output shaft 45 which is coupled to the wrapper connector drive mans within the case 43.

The gear transmission means in the central transmission case has a forward-reverse rotation change means, which is operated by a lever 46 shown in FIG. 13 to change the direction of rotation.

Although the operation of the present device will be apparent from the foregoing detailed description, the operation will be described below.

When the tiller unit 5 of the rotary cultivator 1 connected to a tractor is driven in the direction of arrow A, the field is cultivated by upward cutting to a depth set by the gauge wheels 13.

The blocks of cultivated soil carried around by the tines 4 of the tiller unit 5 are moved along the inner surface of the tiller cover assembly 6 and guided rearward (rightward in FIG. 1) while being broken down.

The rake 16 having rake members spaced apart along the width of cultivation is provided inside the tiller cover assembly 6, i.e., inside the rear cover 9 according to the invention. Consequently the soil blocks larger than the prong space L of the rake 16 fall along the front side of the rake without passing through the spaces L. Long matters such as grass, straw, etc. also fall along the rake front side.

On the other hand, the lumps or blocks of soil not larger than the spacing L move rearward through the rake 16, with the result that the cultivated soil is divided into a lower layer of blocks or coarse grains of soil, grass, straw, etc. and an overlying layer of fine soil particles and is leveled by the leveling portion 9A of the rear cover 9.

The cultivated soil contains hard pieces of soil, stones, gravel, etc. in mixture. When such hard objects strike the rake member as indicated by an arrow F in FIGS. 2 and 7, the rake member, which is in the form of a resilient rod, is elastically deformed as supported by the fixing means 25 at its base end to mitigate and absorb the impact.

Further when stones or large blocks of soil strike rake members, the impact force F will not be fully mitigated or absorbed by the elastic deformation only of the resilient rods 17, but coiled portions 19 at the base end of the rake 16 elastically deform to absorb the great impact F, preventing bending, damage or break of the rake members and also damage to the fixing means 25.

When the rear cover 9 is most proximate to the rake 16, the coiled portions 19 come into contact with the inner surface of the rear cover 9 to maintain a minimum clearance between the sieving portions 20 and the rear cover 9, assuring the sieving portions 20 of a fine soil separating action.

What is claimed is:

1. A rake device for a rotary cultivator including a multiplicity of rake members provided between the tiller unit of the cultivator and a rear cover of the cover assembly covering the tiller unit, the rake members being arranged at a spacing along the width of cultivation, so that the lumps and blocks of soil cultivated by the tiller unit are caused to strike the rake for sieving, the rake device being characterized in that each of the rake members is formed with a coiled portion toward its base end and connected to the tiller cover assembly by fixing means at a position toward the base end from the coiled portion while permitting elastic deformation of the coiled portion, the rake member having a sieving portion extending from the coiled portion toward the free end thereof, the coiled portion projecting toward the rear cover to permit the inner surface of the rear cover to contact the coiled portion and form a clearance between the rear cover and the sieving portion.

2. A rake device as defined in claim 1 wherein each of the rake members is formed by bending a single resilient rod and has a U-shaped portion and the coiled portion at each side of the U-shaped portion, sieving portions extending downward from the opposed coiled portions in parallel with each other, the U-shaped portion being clamped between a fixing member and curved portions of a holder, the holder being fastened to the fixing member by a bolt between the curved portions.

3. A rake device as defined in claim 1 wherein an attaching base is fixed at its opposite ends to opposed side covers of the tiller cover assembly, each of the rake members being made of a resilient rod bent at its base end toward a direction intersecting its longitudinal direction to provide a hooked portion, the hooked portion being inserted in the base and held thereto against slipping off, the base end portions of each two adjacent rake members being pressed against the base by a holder fixed by a bolt.

4. A rake device as defined in claim 1 wherein the coiled portions of each two adjacent rake members extend downward away from or toward each other when seen from behind.

5. A rake device as defined in claim 1 wherein the tiller unit is rotatable in an upward cutting direction.

6. A rake device as defined in claim 1 wherein the tiller unit is reversibly rotatable in an upward cutting direction or downward cutting direction.

7. A rake device as defined in claim 1, further including protector means being provided on the inner side of the coiled portion whereby the lumps or blocks of soil carried around the tiller unit in rotation in an upward cutting direction are prevented from striking the coiled portion, said protector means integrally extending rearwardly downward from a member internally provided on the tiller cover assembly.

8. A rake device as defined in claim 7, wherein each of the rake members is made of a resilient rod, said resilient rod being welded at its base end to an attaching base adjacent said protector means, and the rake device being removably attached to a stationary member of the cultivator by means of the attaching base.

* * * * *